(12) United States Patent
Rusanovskyy

(10) Patent No.: US 11,057,623 B2
(45) Date of Patent: Jul. 6, 2021

(54) DEBLOCK FILTERING FOR VIDEO CODING

(71) Applicant: QUALCOMM Incorporated, San Diego, CA (US)

(72) Inventor: Dmytro Rusanovskyy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/915,439

(22) Filed: Jun. 29, 2020

(65) Prior Publication Data

US 2021/0006781 A1 Jan. 7, 2021

Related U.S. Application Data

(60) Provisional application No. 62/870,593, filed on Jul. 3, 2019.

(51) Int. Cl.
| | |
|---|---|
| *H04N 19/117* | (2014.01) |
| *H04N 19/196* | (2014.01) |
| *H04N 19/176* | (2014.01) |
| *H04N 19/146* | (2014.01) |
| *H04N 19/159* | (2014.01) |
| *H04N 19/86* | (2014.01) |

(52) U.S. Cl.
CPC ......... *H04N 19/117* (2014.11); *H04N 19/146* (2014.11); *H04N 19/159* (2014.11); *H04N 19/176* (2014.11); *H04N 19/196* (2014.11); *H04N 19/86* (2014.11)

(58) Field of Classification Search
None
See application file for complete search history.

(56) References Cited

U.S. PATENT DOCUMENTS

2018/0091812 A1* 3/2018 Guo ................. H04N 19/117

OTHER PUBLICATIONS

"Advanced Video Coding for Generic Audiovisual Services; H.264 (Jun. 2011)", ITU-T Standard International Telecommunication Union, Geneva, CH, No. H.264 (Jun. 2011), Jun. 29, 2011 (Jun. 29, 2011), pp. 1-661, XP017575181 (Year: 2011).*
"Advanced Video Coding for Generic Audiovisual Services; H.264 (Jun. 2011)", ITU-T Standard International Telecommunication Union, Geneva, CH, No. H.264 (Jun. 2011), Jun. 29, 2011 (Jun. 29, 2011), pp. 1-661, XP017575181, [retrieved on Feb. 28, 2012].

(Continued)

*Primary Examiner* — Stuart D Bennett
(74) *Attorney, Agent, or Firm* — Shumaker & Sieffert, P.A.

(57) ABSTRACT

This disclosure describes ways in which to incorporate bit depth information for determining one or more deblocking control parameters. A method of processing video data may include determining one or more initial deblocking control parameters based on a stored parameter and a bit depth of samples of a current block of the video data, determining an adjustment value by which to adjust the one or more initial deblocking control parameters based on the bit depth of the samples of the current block, determining one or more deblocking control parameters based on the adjustment value and the one or more initial deblock control parameters, and deblock filtering one or more samples of the current block based on the determined one or more deblocking control parameters.

20 Claims, 7 Drawing Sheets

(56) References Cited

OTHER PUBLICATIONS

Bross B., et al., "Versatile Video Coding (Draft 5)", 14th JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v9, Jun. 25, 2019 (Jun. 25, 2019), XP030220730, 403 pages, Retrieved from the Internet: URL:http://phenix.int-evry.fr/jvet/doc_end_user/documents/14_Geneva/wg11/JVET-N1001-v9.zip, JVET-N1001-v9.docx [retrieved on Jun. 25, 2019].

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Chen J., et al., "Algorithm Description of Joint Exploration Test Model 1", 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/, No. JVET-A1001, Feb. 24, 2016 (Feb. 24, 2016), XP030150000, 27 Pages.

Gisquet (Canon) C., et al., "Non-CE2: Higher-precision Modifications to WC Deblocking Filters", 11. JVET Meeting, Jul. 10, 2018-Jul. 18, 2018, Ljubljana, (The Joint Video Exploration Team of ISO/IEC JTC1/SC29/WG11 and ITU-T SG.16), No. JVET-K0203, Jul. 14, 2018 (Jul. 14, 2018), XP030199738, 5 pages, Retrieved from the Internet: URL:http://phenix.int-evry.fr/jvet/doc_end_user/documents/11_Ljubljana/wg11/JVET-K0203-v4.zip JVET-K0203_r3.docx [retrieved on Jul. 14, 2018].

"Information Technology—General Video Coding—Part 1: Essential Video Coding", ISO/IEC FDIS 23094-1, ISO/IEC JTC1/SC 29/WG 11, 2020, 354 Pages.

International Search Report and Written Opinion—PCT/US2020/040258—ISA/EPO—Sep. 28, 2020 17 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.

\* cited by examiner

DEBLOCK FILTERING FOR VIDEO CODING

This application claims the benefit of U.S. Provisional Application No. 62/870,593, filed Jul. 3, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for deblock filtering for video coding. For instance, the techniques are related to a filtering process performed on video frames distorted by compression, blurring, etc., to improve the objective and subjective qualities. The example techniques may be used in the design of the new video coding solutions, such as H.266/Versatile Video Coding (VVC) or Essential Video Coding (EVC), or extending any of the existing video codecs, such as H.265/High Efficiency Video Coding (HEVC), or be proposed as a coding tool to future video coding standards. The example techniques may also be used as a post-processing method on video frames outputted from either standard or proprietary codecs.

To perform deblock filtering, a video coder may need to determine deblocking control parameters that control how much deblock filtering is applied (e.g., how many samples to filter, by how much to filter a sample, etc.) based on characteristics of the samples along a segment. The bit depth (e.g., how many bits are used to represent the color of a sample) may impact one or more of the deblocking control parameters. As an example, a clipping parameter that defines a maximum that a sample can be modified from deblock filtering may be based on the bit depth.

This disclosure describes example ways in which to incorporate bit depth information for determining one or more deblocking control parameters. In this way, the deblocking control parameters that a video coder utilizes for deblock filtering may result in more optimal filtering as compared to over or under filtering that may occur where bit depth information is not utilized for determining the one or more deblocking control parameters. Accordingly, this disclosure describes practical applications of deblock filtering that improve the overall operation of the video coder.

In one example, the disclosure describes a method of processing video data, the method comprising determining one or more initial deblocking control parameters based on a stored parameter and a bit depth of samples of a current block of the video data, determining an adjustment value by which to adjust the one or more initial deblocking control parameters based on the bit depth of the samples of the current block, determining one or more deblocking control parameters based on the adjustment value and the one or more initial deblock control parameters, and deblock filtering one or more samples of the current block based on the determined one or more deblocking control parameters.

In one example, the disclosure describes a device for processing video data, the device comprising a memory configured to store a parameter used for deblock filtering and processing circuitry configured to determine one or more initial deblocking control parameters based on the stored parameter and a bit depth of samples of a current block of the video data, determine an adjustment value by which to adjust the one or more initial deblocking control parameters based on the bit depth of the samples of the current block, determine one or more deblocking control parameters based on the adjustment value and the one or more initial deblock control parameters, and deblock filter one or more samples of the current block based on the determined one or more deblocking control parameters.

In one example, the disclosure describes a computer-readable storage medium having stored thereon instructions that, when executed, cause one or more processors to determine one or more initial deblocking control parameters based on a stored parameter and a bit depth of samples of a current block of the video data, determine an adjustment value by which to adjust the one or more initial deblocking control parameters based on the bit depth of the samples of the current block, determine one or more deblocking control parameters based on the adjustment value and the one or more initial deblock control parameters, and deblock filter one or more samples of the current block based on the determined one or more deblocking control parameters.

The details of one or more examples are set forth in the accompanying drawings and the description below. Other features, objects, and advantages will be apparent from the description, drawings, and claims.

DETAILED DESCRIPTION

Figure 1:
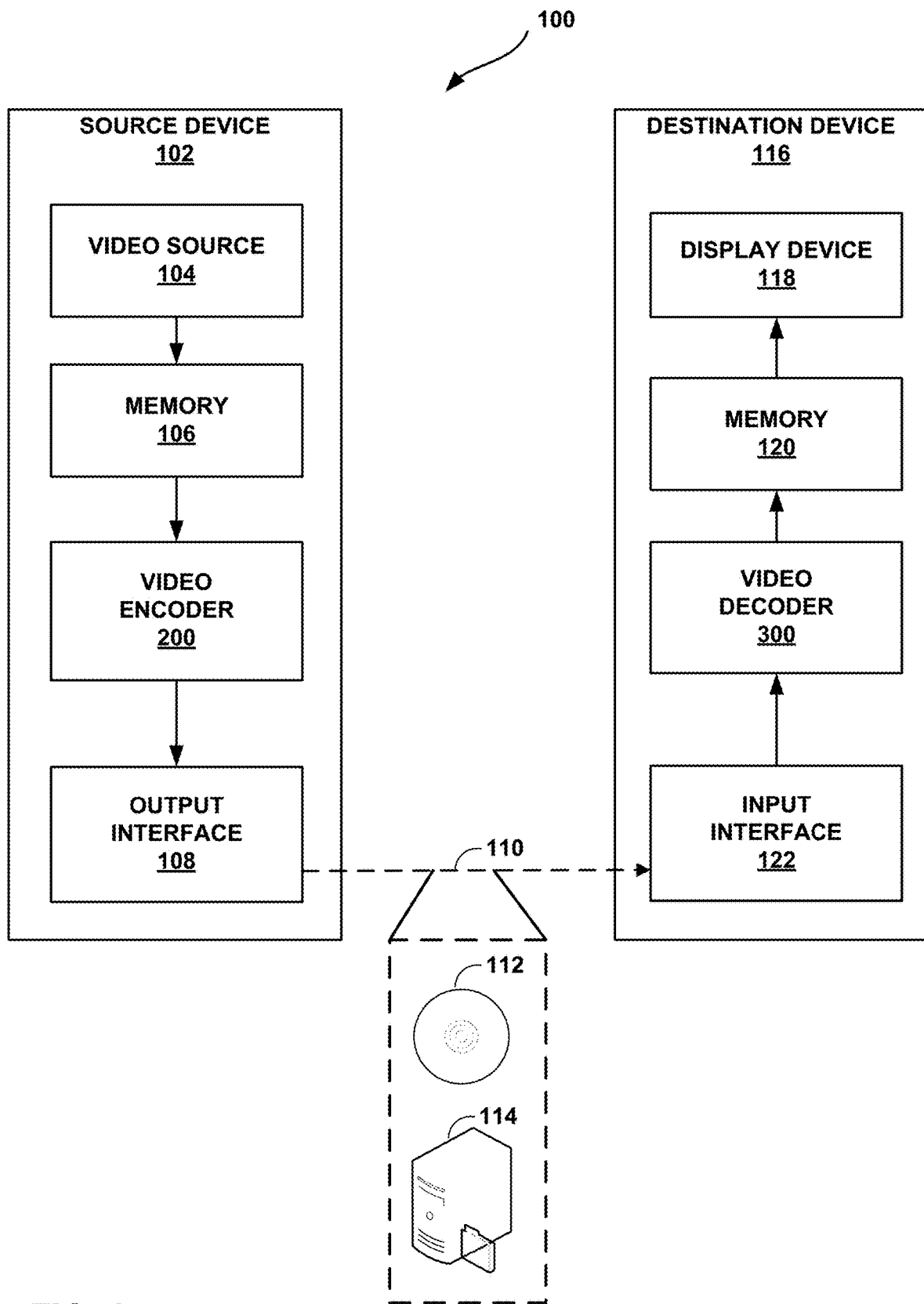
FIG. 1 is a block diagram illustrating an example video encoding and decoding system that may perform the techniques of this disclosure.

In video coding, a video encoder partitions a picture into blocks. For a current block of the picture being encoded, the video encoder determines a prediction block. The video encoder determines a residual (e.g., difference) block between the prediction block and the current block, and in some examples, transforms and quantizes the residual block. The video encoder then entropy encodes and signals the transformed, quantized residual block.

The video decoder generally performs the inverse operations. For example, the video decoder inverse quantizes and inverse transforms to generate the residual block. The video decoder also determines a prediction block in a similar way as the video encoder (e.g., based on prediction mode information signaled by the video encoder to the video decoder). The video decoder adds the residual block to the prediction block to reconstruct the current block.

The quantization process may be a lossy process, and the amount of quantization that is applied between two neighboring blocks may be different. Accordingly, lossy quantization process and the partitioning of pictures into blocks may cause blocking artifacts in the reconstructed current block. The blocking artifacts may be present along the segment (e.g., boundary of the current block) but can exist other places as well.

That is, blocking artifacts (e.g., the horizontal and vertical discontinuities that do not exist in the original picture) are caused by moderate to high compression with the quantization process. A picture can be still image or a frame from a video sequence. These artifacts in flat areas look like "tiling," since they are not masked by highly contrasted content. Furthermore, the blocking artifacts in a playing video are usually observed as "moving and flickering," because the discontinuities locate differently in successive frames.

One source of blocking artifacts is the block-based transform coding, including transform and quantization, on intra and inter prediction errors. Coarse quantization of the transform coefficients can cause visually disturbing discontinuities at the block boundaries. For videos, there is another source: motion compensated prediction. Motion compensated blocks are generated by copying interpolated pixel data from different locations of possibly different reference frames. Since there is almost never a perfect fit for these data, discontinuities on the boundary of the copied blocks of data typically arise.

Deblocking (e.g., deblock filtering) is usually performed after a picture is reconstructed, to attenuate the blocking artifacts. More specifically, deblock filtering modifies the values of the samples located near each block boundary, by filtering, clipping, or any other means, such that the discontinuity is smoothed and not so visible.

In video compression (e.g., coding), deblock filtering can be placed outside the prediction loop, operating on the display buffer, or placed in the prediction loop, meaning the deblocked pictures are used as reference pictures for the motion compensation of subsequent pictures. Both methods provide better subjective quality of the displayed video, while the latter offers benefits in objective performance as well, because the accuracy of inter prediction is improved by using deblocked reference frames.

In examples where the deblocked pictures are used as reference pictures for subsequent pictures, a video encoder and a video decoder may both be configured to perform deblocking filter. For instance, the video encoder includes a decoding loop that reconstructs the picture being encoded in a similar manner as how the video decoder will reconstruct the picture. The video encoder may perform the deblock filtering on the reconstructed picture similar to how the video decoder will perform the deblock filtering so that the reference pictures used by the video encoder and video decoder are the same. Accordingly, the deblock filtering may be applied by the video encoder and the video decoder, or may be applied by only the video decoder, such as in examples where the deblocked picture is not used as a reference picture for subsequent pictures.

The example techniques described in this disclosure may provide improvements to deblock filtering techniques. As described in more detail below, deblock filtering is performed with using $\beta$ and $t_C$ parameters, which are examples of deblocking control parameters. The disclosure describes example techniques for determining deblocking control parameters that may potentially improve the operation of deblock filtering such as in cases where new types of content is being deployed. For instance, for different types of content, existing techniques for determining deblocking control parameters may not properly account for the changes in the content type and rely too much on factors that may not impact good quality deblock filtering (e.g., deblock filtering with proper smoothing). With the example techniques described in this disclosure, a video coder (e.g., video encoder or video decoder) may be configured to determine deblocking control parameters that improve the overall deblock filtering operations, which may result in higher quality pictures with fewer artifacts.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deblock filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for deblock filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v9 (hereinafter "VVC Draft 5"). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

The example techniques described in this disclosure may be applicable for other video coding standards. Video encoder 200 and video decoder 300 may operate according to the MPEG-5 Essential Video Coding (EVC) standard. The MPEG-5 EVC standard is described in "Information technology—General video coding—Part 1: Essential video coding," ISO/IEC FDIS 23094-1 and ISO/IEC JTC1/SC 29/WG 11, w19229, (hereinafter "EVC Draft").

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction ($y=16$) and 16 samples in a horizontal direction ($x=16$). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As described in more detail, the example techniques described in this disclosure relate to ways in which a video coder (e.g., video encoder 200 or video decoder 300) performs deblock filtering. For instance, video encoder 200 and video decoder 300 may be configured to determine deblocking control parameters used for deblock filtering based on a variety of different adjustments to parameters used for reconstruction of video data (e.g., a current block). In this way, there may be greater flexibility in determining the deblocking control parameters for performing the deblock filtering, which may result in higher quality pictures. For instance, as new content types are developed, existing techniques to determine deblocking control parameters may be insufficient to ensure that the determined deblocking control parameters result in deblock filtering with minimal artifacts.

In general, deblock filtering occurs across a segment (also called boundary in some examples). The segment may be the boundary between two neighboring blocks. However, the example techniques are not limited to segments between two neighboring blocks, and the segment may be within the block. To perform deblock filtering, video encoder 200 and video decoder 300 access sample values from each side of the segment and generate a deblock filtered sample value based on the access sample values. The deblock filtering may be based on deblocking control parameters that indicate how to deblock filters, and this disclosure describes examples of techniques for determining the deblocking control parameters.

For instance, video encoder 200 or video decoder 300 may first determine how likely it is for there to be blocking artifacts along a segment. If there is a likelihood of there being blocking artifacts, video encoder 200 or video decoder 300 may determine deblocking control parameters.

Video encoder 200 or video decoder 300 may determine how likely it is for there to be blocking artifacts along a segment based on whether block and neighboring blocks were predicted in the same prediction mode (e.g., both are inter-predicted) or in different prediction modes (e.g., one is intra-predicted and the other is inter-predicted). If inter-predicted, the motion vector and reference index may also be factors for determining likelihood of blocking artifacts. The presence of non-zero transform coefficients may also be a factor for determining likelihood of blocking artifacts. Video encoder 200 or video decoder 300 may utilize the various example factors to determine a boundary strength (BS) value indicative of how likely blocking artifacts would appear along a segment.

For segments where there is likelihood of blocking artifacts, video encoder 200 or video decoder 300 may determine the deblocking control parameters that define how to perform the deblock filtering. In accordance with the techniques of this disclosure, a video coder (e.g., video encoder 200 or video decoder 300) may be configured to determine information indicative of one or more adjustments to one or more parameters used for reconstructing the video data, determine one or more deblocking control parameters based on the determined information, and deblock filter one or more samples of a current block based on the determined one or more deblocking control parameters.

Examples of the deblocking control parameters includes a beta (β) parameter and a clipping parameter ($t_C$). The beta parameter may control whether deblock filtering is actually performed, and if deblock filtering is to be performed, whether strong or normal deblock filtering is to be performed. The clipping parameter controls the maximum a sample can be adjusted from deblock filtering. For instance, deblock filtering may smooth blocky artifacts, but there should not be oversmoothing or undersmoothing. If the deblock filtered sample values are not clipped to be within a particular range, then there is a possibility of oversmoothing or undersmoothing, and the resulting video may be of lower video quality.

There may be various factors that determine the deblocking control parameters. For example, the beta and clipping parameters may be based on quantization parameters and a look-up table (LUT) stored by video encoder 200 and video decoder 300. As one example, for the clipping parameter, the LUT includes stored parameters, and video encoder 200 or video decoder 300 may retrieve a stored parameter from the LUT based on the quantization parameters and the BS (boundary strength) value.

From the stored parameter, video encoder 200 and video decoder 300 may determine one or more initial deblocking control parameters (e.g., an initial clipping parameter). The one or more initial deblocking control parameters may be based on the stored parameter and a bit depth of samples of a current block (e.g., the number of bits used to represent colors of the samples of the current block).

Video encoder 200 or video decoder 300 may need to adjust the one or more initial deblocking control parameters (e.g., the initial clipping parameter). In one or more examples described in this disclosure, the amount by which the initial deblocking control parameters are adjusted may be based on the bit depth of the samples of the current block. If the bit depth of the samples is not accounted for when determining the amount by which the initial deblocking control parameters are adjusted, then the deblocking control parameters may cause oversmoothing or undersmoothing of the blocking artifacts.

Stated another way, some other techniques determined the amount by which to adjust the initial deblocking control parameters without accounting for the bit depth, which may have been sufficient if the bit depth is constant. However, in examples where the bit depth may be selected from different possible bit depth choices (e.g., 8-bit or 10-bit), without accounting for the bit depth, the adjustment of the initial deblocking control parameters may be incorrect. In one or more examples described in this disclosure, video encoder 200 or video decoder 300 may determine an adjustment value by which to adjust the one or more initial deblocking control parameters (e.g., initial clipping parameter) based on the bit depth of the samples of the current block. Video encoder 200 and video decoder 300 may deblock filter one or more samples of the current block base don the determined one or more deblocking control parameters.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, the example techniques are related to deblock filtering. The following provides an explanation of deblock filtering techniques generally and ways in which to perform deblock filtering according to example techniques described in this disclosure.

The deblock filtering, in HEVC, is an in-loop process, and is applied to the boundaries (e.g., segments) satisfying the two conditions: (1) the boundaries are of coding units (CU), prediction units (PU), or transform units (TU), and (2) the x-coordinate is multiples of 8, if the boundary is vertical and the y-coordinate is multiples of 8, if the boundary is horizontal. The second condition means that the minimum distance of two parallel neighboring boundaries to be deblocked is 8 pixels, which facilitates better parallelization (as described below in the description of parallelization). A boundary to be processed, no matter how long the boundary is, may be divided into multiple non-overlapped 4-sample segments. The 4-sample segments may be units on which the deblocking techniques (e.g., deblock filtering) are applied. In this disclosure, the deblocking operations on a segment (e.g., boundary) will be introduced, and the segment is assumed to be vertical. The processing on horizontal segments may be the same (e.g., is essentially the same).

Figure 2:
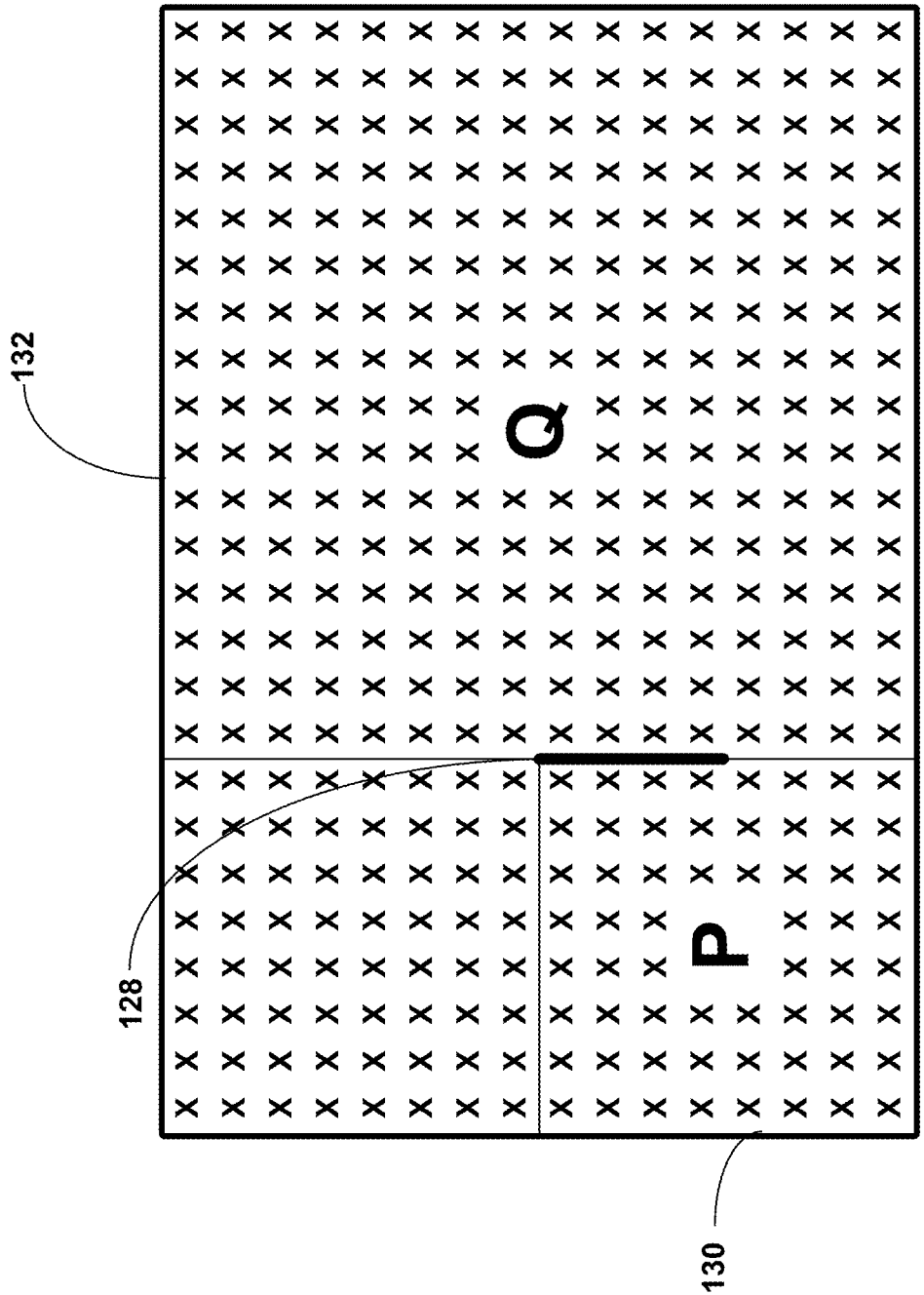
FIG. 2 is a conceptual diagram illustrating an example of four-samples to be deblocked with adjacent blocks.

For deblock filtering, the video coder may determine boundary strength (BS). The following describes boundary strength (BS) determination. FIG. 2 is a conceptual diagram illustrating an example of four-samples to be deblocked with adjacent blocks. For instance, FIG. 2 illustrates a four-sample segment (e.g., bold line 128 in FIG. 2 between block P 130 and block Q 130) to be deblocked with adjacent block P 130 and block Q 132. For example, as illustrated in FIG. 2, segment 128 is a vertical line that is a length of four rows.

For segment 128 to be processed (e.g., for samples along segment 128 to be deblock filtered), the coding conditions (such as motion vector (MV), reference index, and the presence of non-zero transform coefficients) of the two blocks on either side, denoted as block P 130 and block Q 132 in FIG. 2, are examined, and the boundary strength (BS), representing how likely strong blocking artifacts would appear along the segment, is determined accordingly. In other words, a video coder (e.g., video encoder 200 or video decoder 300) may determine a BS value for segment 128 based on motion vector, reference index, and presence of non-zero transform coefficients in block P 120 and block Q 132.

The BS value can be 0, meaning that the coding conditions in block P 130 and block Q 132 do not cause blocking artifacts and deblocking for this segment should be skipped.

The BS value can be 2, meaning the coding conditions in block P 130 and block Q 132 may cause severe blocking artifacts and stronger filtering should be applied. The BS value can be 1, meaning that the coding conditions in block P 130 and block Q 132 are such that there may be somewhere between no blocking artifacts and severe blocking artifacts. For chroma, the segments adjacent to intra coded block(s) are assigned BS equal to 2, and otherwise have BS equal to 0.

The details of BS derivation can be found in section 8.7.2.1 of H.264/AVC ("ITU-T H.264, Series H: Audiovisual and Multimedia Systems, Infrastructure of audiovisual services—Coding of moving video, The International Telecommunication Union, June 2011, 674 pp), section 8.7.2.4 of HEVC ("ITU-T H.265, Series H: Audiovisual and Multimedia Systems, Infrastructure of audiovisual services—Coding of moving video, High efficiency video coding, The International Telecommunication Union, April 2015, 634 pp), and section 8.8.3.5 of VVC Draft 5. Other examples for determining the boundary strength value is described in section 8.8.3.4 of the EVC Draft, such as description of techniques to derive $bS[xD_i][yD_i]$. The techniques described in this disclosure are not limited to any particular manner in which to determine the boundary strength value.

The following describes some other decisions for luma with respect to deblock filtering. In the above description of boundary strength (BS) determination, the possibility that segment 128 has blocking artifacts is estimated only based on the coding conditions of the adjacent blocks (e.g., block P 130 and block Q 132). However, whether and how segment 128 should be deblock filtered may be determined by further analyzing the values of the samples near that segment 128.

Figure 3:
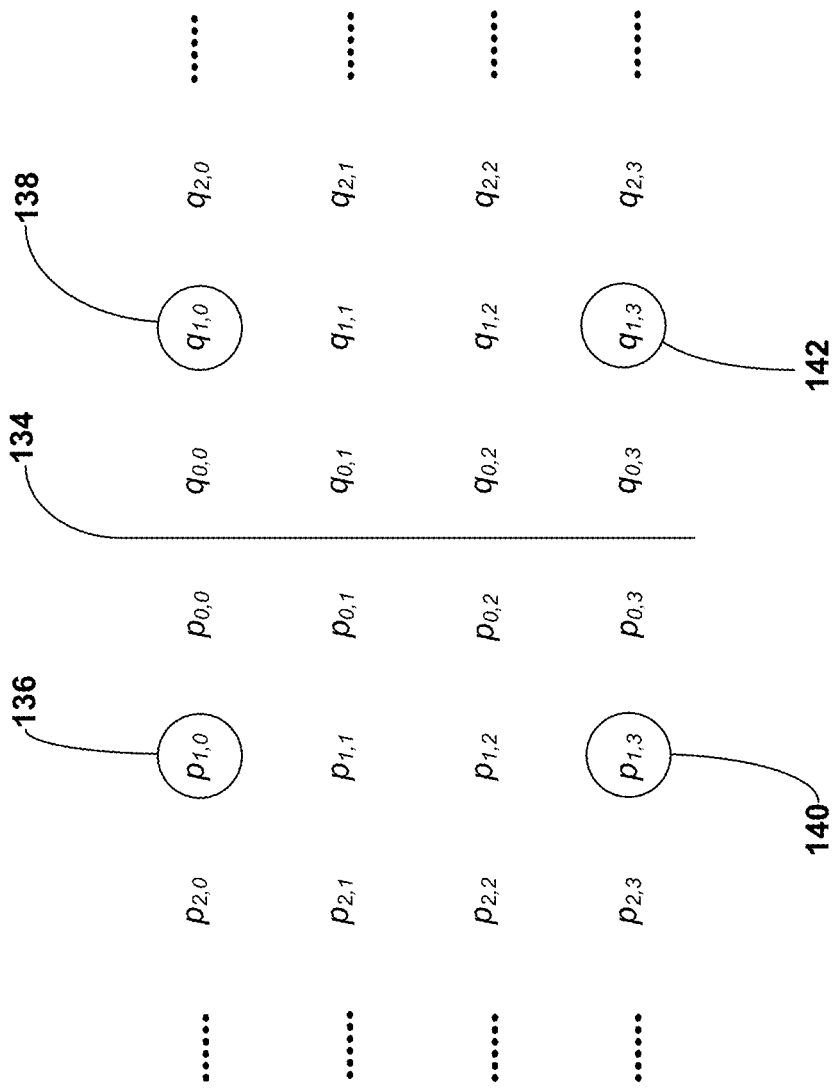
FIG. 3 is a conceptual diagram illustrating an example of samples used to determine whether deblocking is applied on a segment.

The video coder may determine whether to deblock filter segment 128 by calculating the $2^{nd}$ derivatives of the four samples near the segment 128. FIG. 3 is a conceptual diagram illustrating an example of samples used to determine whether deblocking is applied on a segment. For example, FIG. 3 illustrates segment 134, and the four samples (e.g., sample 136, sample 138, sample 140, and sample 142) are illustrated as circled samples in FIG. 3. In FIG. 3, the video coder may determine the $2^{nd}$ derivatives of the four circled samples (e.g., sample 136, sample 138, sample 140, and sample 142). The video coder may determine the summation of the $2^{nd}$ derivatives to determine whether deblock filtering should be applied on this segment (e.g., segment 134).

If the summation of the four $2^{nd}$ derivatives (see Eq. (1) below) is smaller than the threshold beta ($\beta$), as described later with respect to threshold $\beta$ and $t_C$, the segment 134 needs to be deblocked. Otherwise, segment 134 is considered locating in a non-flat area, where the blocking artifacts are likely to be masked, and thus is not deblocked. A segment even with non-zero BS may skip deblocking, if the threshold is not reached.

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta \quad (1)$$

As described above, beta (e.g., $\beta$) is an example of one or more deblocking control parameters that the video coder may determine to determine how to deblock filter. Initially, however, the beta parameter may indicate whether deblock filtering is even needed. For example, it may be possible that the video coder determined that the BS value is non-zero, which means that there is a likelihood of blocking artifacts. However, if equation 1 is not satisfied (e.g., the summation of the $2^{nd}$ derivatives is greater than beta), then deblock filtering may not be needed even if the BS value is non-zero.

Once the video coder determines that segment 134 is to be deblock filtered, the video coder may determine whether to use strong or normal filtering mode. For example, if the following 6 conditions (Eqs. (2-1) to (2-6)) are all true, which means the area is too smooth to mask any blocking artifacts, the strong filtering mode is used. Otherwise, the normal filtering mode is used.

$$|p_{2,0}-2p_{1,0}+p_{0,0}|+|q_{2,0}-2q_{1,0}+q_{0,0}|<\beta/8 \quad (2\text{-}1)$$

$$|p_{2,3}-2p_{1,3}+p_{0,3}|+|q_{2,3}-2q_{1,3}+q_{0,3}|<\beta/8 \quad (2\text{-}2)$$

$$|p_{3,0}-p_{0,0}|+|q_{0,0}-q_{3,0}|<\beta/8 \quad (2\text{-}3)$$

$$|p_{3,3}-p_{0,3}|+|q_{0,3}-q_{3,3}|<\beta/8 \quad (2\text{-}4)$$

$$|p_{0,0}-q_{0,0}|<2.5t_C \quad (2\text{-}5)$$

$$|p_{0,3}-q_{0,3}|<2.5t_C \quad (2\text{-}6)$$

The threshold parameter $t_C$ is the clipping parameter, as described later below with respect to threshold $\beta$ and $t_C$. In the above examples, the analysis and derivations are made at the segment level (e.g., for segment 134).

Figure 4:
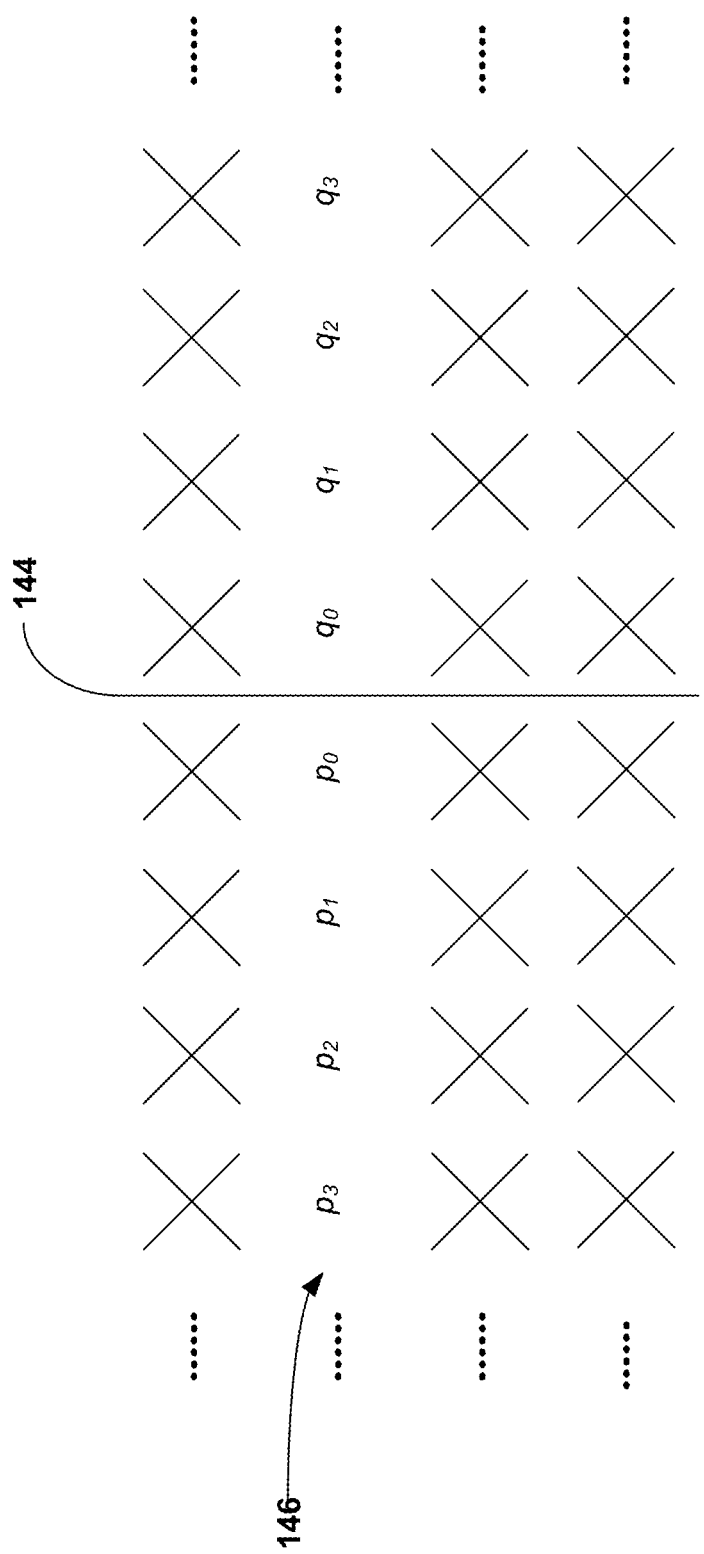
FIG. 4 is a conceptual diagram illustrating an example line in a segment to be deblocked.

FIG. 4 is a conceptual diagram illustrating an example line in a segment to be deblocked. For example, FIG. 4 illustrates segment 144 and row 146 having samples on each side of segment 144. In some of the below examples, described with respect to strong filtering mode for luma and normal filtering mode for luma, where the deblocking for a vertical segment is performed line by line (column by column if the segment is horizontal), the operation for only one line (e.g., row 146) is described. The physical positions of $p_0$, $p_1$, $p_2$, $p_3$, $q_0$, $q_1$, $q_2$, and $q_3$ are illustrated in FIG. 4. In FIG. 4, one of the four lines (e.g., row 146) in segment 144 is to be deblock filtered.

The following describes strong filtering mode for luma. In this mode, three samples on either side of the segment are processed. The following example is described with respect to samples $p_0$, $p_1$, and $p_2$, as an example. The values of samples $p_0$, $p_1$, and $p_2$ may be updated to $p_0'$, $p_1'$, and $p_2'$, by low-pass filtering, as shown in Eqs. (3-1) to (3-3).

$$p'_0=(p_2+2p_1+2p_0+2q_0+q_1+4)>>3 \quad (3\text{-}1)$$

$$p'_1=(p_2+p_1+p_0+q_0+2)>>2 \quad (3\text{-}2)$$

$$p'_2=(2p_3+3p_2+p_1+p_0+q_0+4)>>3 \quad (3\text{-}3)$$

The video coder may clip the modified sample values $p_i'$ (i=0, 1, 2) to the range $[p_i-2t_C, p_i+2t_C]$. To deblock filter samples $q_0$, $q_1$, and $q_2$, the video coder may utilize Eqs. (3-1) to (3-3) after swapping p with q, and then apply clipping in the same way. Example ways to determine the clipping parameter ($t_C$) are described in more detail. In particular, the clipping parameter may be considered as an example of a deblocking control parameter, and this disclosure describes example ways in which to determine the one or more deblocking control parameters based on bit depth.

The following describes normal filtering mode for luma. In this mode, one or two samples on either side of the segment (e.g., segment 144) are processed. For the left side of a segment 144 (see FIG. 4), the video coder checks the condition in Eq. (4-1). If the condition is true, $p_0$ and $p_1$ need to be processed (e.g., deblock filtered). Otherwise, only $p_0$ is processed (e.g., only $p_0$ is deblock filtered). Similarly, for the right side, the condition in Eq. (4-2) is used to decide if $q_1$ needs to be processed in addition to $q_0$. The decision on the number of samples to be processed is made independently on either side of segment 144. Accordingly, it may be possible to process one sample on one side of segment 144 and two on the other side of segment 144.

$$|p_{2,0}-2p_{1,0}+p_{0,0}|+|p_{2,3}-2p_{1,3}+p_{0,3}|<3/16\beta \quad (4\text{-}1)$$

$$|q_{2,0}-2q_{1,0}+q_{0,0}|+|q_{2,3}-2q_{1,3}+q_{0,3}|<3/16\beta \quad (4\text{-}2)$$

To process (e.g., deblock filter) $p_0$ and $q_0$, an intermediate value $\delta$ is first calculated as in (5).

$$\delta=(9(q_0-p_0)-3(q_1-p_1)+8)\!>\!>\!4 \quad (5)$$

If the absolute value of $\delta$ is greater than or equal to 10 times of $t_C$, the boundary is considered as a natural edge, which should be preserved. In such examples, the deblocking on the current line is not performed. Otherwise, $\delta$ is clipped into the range from $-t_C$ to $t_C$, as shown in (6).

$$\Delta_0=\text{Clip3}(-t_C,t_C,\delta) \quad (6)$$

The values of $p_0$ and $q_0$ is updated to $p_0'$ and $q_0'$, by adding and subtracting $\Delta_0$, respectively, as shown in (7-1) and (7-2).

$$p'_0=p_0+\Delta_0 \quad (7\text{-}1)$$

$$q'_0=q_0-\Delta_0 \quad (7\text{-}2)$$

To process the $2^{nd}$ sample on either side of the segment, i.e., $p_1$ and $q_1$, (8-1) and (8-2) are used to get the updated values $p_1'$ and $q_1'$.

$$p'_1 = p_1 + \text{Clip3}\left(-\frac{t_C}{2}, \frac{t_C}{2}, (((p_2 + p_0 + 1) \gg 1) - p_1 + \Delta_0) \gg 1\right) \quad (8\text{-}1)$$

$$q'_1 = p_1 + \text{Clip3}\left(-\frac{t_C}{2}, \frac{t_C}{2}, (((q_2 + q_0 + 1) \gg 1) - q_1 - \Delta_0) \gg 1\right) \quad (8\text{-}2)$$

The following describes deblocking for chroma. The way a chroma segment is deblocked is determined by the BS value and no sample value analysis is required. Only the first sample on either side of the segment 144, i.e., $p_0$ and $q_0$, is processed by (7-1) and (7-2), where the delta $\Delta_0$ is calculated as in (9).

$$\Delta_0=\text{Clip3}(-t_C,t_C,(((q_0-p_0)\!<\!<\!2)+p_1-q_1+4)\!>\!>\!3) \quad (9)$$

The following describes threshold $\beta$ and $t_C$. $\beta$ and $t_C$ are examples of one or more deblocking control parameters. This disclosure describes examples for determining one or more deblock control parameters such as based on bit depth of samples of the current block of video data.

To avoid excessive filtering, two parameters $\beta$ and $t_C$ are used in the deblock filtering process, described above. The threshold $\beta$ is used to control the way deblock filtering should be performed, such as whether the segment (e.g., segment 144, segment 134, or segment 128) should be deblock filtered, strong or normal deblock filtering is used, or whether one or two samples on one side of the segment should be processed (e.g., deblock filtered). When $\beta$ or a scaled $\beta$ is reached or exceeded (see Eqs. (1), (2), and (4)), meaning greater variation of local sample values, the deblocking tends to be more conservative, to preserve the details in the original picture. Otherwise, the local sample values have less variation (i.e., smoother), and the deblocking could be performed more aggressively.

The clipping value $t_C$ may be used in controlling the maximum change of sample magnitude, except for Eqs. (2-5) and (2-6). In the normal filtering mode or filtering for chroma, the change of sample magnitude should not exceed $\pm t_C$ for the first sample on one side of segment (applicable to luma and chroma), or $\pm t_C/2$ for the second sample (applicable only to luma). In the strong filtering mode, where greater change in magnitude is implied, the maximum change is $\pm 2t_C$ for the three samples processed on either side of the segment.

In some techniques, the values of $\beta$ and $t_C$ mainly depend on the QP (quantization parameter) values from the left block P (e.g., block P 130) and right block Q (e.g., block Q 132). More specifically, the average of QPs from block P 130 and block Q 132, denoted as $QP_{ave}=(QP_P+QP_Q+1)\!>\!>\!1$, is used as the index to search two 1-D look-up tables (LUTs) for $\beta$ and $t_C$, respectively. Although the searching index to find the $t_C$ value is adjusted by adding two, i.e., $(QP_{ave}+2)$, if BS equals 2, the dominant factor determining the values of $\beta$ and $t_C$ is still $QP_{ave}$. In both LUTs, the entry values monotonically increase with the value of the search indices, which means the higher the $QP_{ave}$ is, the greater values $\beta$ and $t_C$ will have, thus heavier deblock filtering is more likely to be selected and greater magnitude change is allowed. Lower QP, on the contrary, leads to smaller or even zero value of $\beta$ and $t_C$. For example, because when coded with low QP, a picture hardly has any blocking artifacts, and therefore needs lighter or even no deblocking.

The indices used to search $\beta$ and $t_C$ in LUTs, denoted as $\text{idx}_\beta$ and $\text{idx}_{tc}$, can be further adjusted by two parameters tc_offset_div2 and beta_offset_div2, respectively (see (10-1) and (10-2)), $$\text{idx}_\beta=QP_{ave}+2\times\text{beta\_offset\_div2} \quad (10\text{-}1)$$

$$\text{idx}_{tc}=QP_{ave}+2\times(\text{BS}-1)+2\times\text{tc\_offset\_div2} \quad (10\text{-}2)$$

In some examples, tc_offset_div2 and beta_offset_div2 are sent in a slice header or a picture parameter set (PPS). This gives an encoder (e.g., video encoder 200) the possibility to adapt the deblocking strength depending on the sequence characteristics, the encoding mode, and other factors.

The following describes parallelization. In HEVC, for deblock filtering, there may be two stages: (1) filter all the vertical block boundaries in a picture and (2) filter all the horizontal block boundaries. In Stage (2), the samples used for mode decision and filtering are the output of Stage (1). In each stage, where boundaries being deblock filtered are all parallel and at least 8 samples apart, the samples involved in deblock filtering one boundary do not overlap with the samples involved in deblock filtering any other boundaries (note "the samples involved in deblocking one boundary" includes up to three samples to be filtered on either side of the boundary and up to four samples on either side to support the filtering and mode decision) and therefore one boundary can be deblock filtered in parallel to any other boundaries.

The following summarizes deblocking (e.g., deblock filtering), as described above. The deblock filtering operations include filtering the samples near a block boundary (e.g., segment) and clipping the change of sample magnitudes. The filtering part offers three levels of the filter strengths: strong, normal, or zero (i.e., no filtering), with increasing local activities of the samples near a block boundary (see Eqs. (1) and (2)). For the strong filtering mode, 3 samples on each side of a block boundary are filtered by low pass filters (see Eq. (3)). For the normal filtering mode, at least the sample closest to the boundary is filtered, and on either side the $2^{nd}$ closest sample may be filtered if the inner samples are smooth enough (see Eq. (4)). The clipping part is controlled by the parameter $t_C$. By strong filtering, the change of sample magnitude is no greater than $2t_C$. By normal filtering, the magnitude changes of the $1^{st}$ and $2^{nd}$ samples are no greater than $t_C$ and $t_C/2$, respectively (see Eqs. (6)-(8)). Different BS values may make a difference in $t_C$, i.e., the segment with BS equal to 2 has greater $t_C$ than the segment with BS equal to 1.

There may be issues with certain deblock filtering techniques. In some deblock filtering techniques, the main characteristics of the deblock filtering are defined through a set of threshold, some of them may be dependent on QP and formulated in the form of LUT (e.g., stored parameters). The video coder may further alter filtering characteristics/strength (e.g., β and $t_C$) either by user-provided control or by other characteristic determined from the signal (e.g. gradient amount on the block boundary). In some examples, the deblock control parameters (e.g., like β and $t_C$) of deblock filtering may be trained on the certain test content, e.g. 8 bit 4:2:0 yuv, CIF resolution (AVC/HEVC time).

However, with new type of content being deployed, e.g. 10/12 bits, 4:2:2, HDR, main deblocking strength/threshold dependency on QP may be altered and automatically attenuated mechanism is need. In other words, the correct deblocking control parameters (e.g., β and $t_C$) for deblock filtering that results in high quality pictures need not necessarily be determined predominantly on the QP (although QP may be factor for determining β and $t_C$) for new type of content being deployed.

In some designs, user defined parameter is communicated to bitstream and applied to alter strength of the filter, e.g. below is example from H.264/AVC. Later designs follow the same concept.

slice_alpha_c0_offset_div2 specifies the offset used in accessing the α and tC0 deblocking filter tables for filtering operations controlled by the macroblocks within the slice. From this value, the offset that shall be applied when addressing these tables shall be computed as FilterOffsetA=slice_alpha_c0_offset_div2<1 (7–32). The value of slice_alpha_c0_offset_div2 shall be in the range of −6 to +6, inclusive. When slice_alpha_c0_offset_div2 is not present in the slice header, the value of slice_alpha_c0_offset_div2 shall be inferred to be equal to 0.

slice_beta_offset_div2 specifies the offset used in accessing the β deblocking filter table for filtering operations controlled by the macroblocks within the slice. From this value, the offset that is applied when addressing the β table of the deblocking filter shall be computed as FilterOffsetB=slice_beta_offset_div2<<1.

In some examples, indexA may be a variable that is used to access the table (Table 8-16 of H.264/AVC) as well as the $t_{C0}$ table (Table 8-17 of H.264/AVC), which is used in filtering of edges (e.g., segments) with BS less than 4 as specified in clause 8.7.2.3 of H.264/AVC, and let indexB be a variable that is used to access the table (Table 8-16 of H.264/AVC). The variables indexA and indexB are derived as:

$$indexA = Clip3(0, 51, qPav + filterOffsetA) \quad (8\text{-}454)$$

$$indexB = Clip3(0, 51, qPav + filterOffsetB) \quad (8\text{-}455)$$

In the above qPav refers to the average of the QPs between two blocks on each side of a boundary (e.g., a segment). The boundary may be a boundary between two blocks, but the example techniques are not so limited. Following that, parameters of filter can be altered by local statistics, e.g. see clause 8.7.2.3 of H.264/AVC.

The following describes filtering process for edges (e.g., segments) with BS less than 4 of H.264/AVC. Inputs to this process are the input sample values pi and qi (i=0 . . . 2) of a single set of samples across an edge that is to be filtered, chromaEdgeFlag, chromaStyleFilteringFlag, BS, β, and indexA, for the set of input samples, as specified in clause 8.7.2 of H.264/AVC. Outputs of this process are the filtered result sample values p'i and q'i (i=0..2) for the set of input sample values.

Depending on the values of indexA and BS, the variable $t'_{C0}$ is specified in Table 8-17. Depending on chromaEdgeFlag, the corresponding threshold variable tC0 is derived as follows:

If chromaEdgeFlag is equal to 0, $$t_{C0} = t'_{C0} * (1 << (BitDepthY - 8))$$

Otherwise (chromaEdgeFlag is equal to 1), $$t_{C0} = t'_{C0} * (1 << (BitDepthC - 8))$$

The threshold variables ap and aq are derived by:

$$ap = Abs(p2 - p0) \quad (8\text{-}463)$$

$$aq = Abs(q2 - q0) \quad (8\text{-}464).$$

The threshold variable $t_C$ is determined as follows:
If chromaStyleFilteringFlag is equal to 0, $$t_C = t_{C0} + ((ap < Beta)?1:0) + ((aq < Beta)?1:0)$$

In the above equation, once $t_{C0}$ is being scaled to accommodate for bit depth increase, strength and clipping value adjustment does not take bit depth increase into consideration. For instance, $t_{C0}$ may be considered as an initial clipping value (e.g., initial deblocking control parameters) and $t_C$ may be the clipping value (e.g., deblocking control parameter) used for deblock filtering. In the above equation, in some cases, it may be possible that $t_{C0}$ (e.g., initial clipping value) is determined based on the bit depth increase. However, $t_C$ (e.g., the clipping value) is not determined based on the bit depth increase.

For example, "ap," in the above equation, may be a first difference value between two samples in line 146 that are located in a first direction of segment 144 for the deblock filtering. For instance, p2 and p0 are both located on line 146 on the left side of segment 144. In the above equation, "aq" may be a second difference value between two samples in line 146 that are located in a second direction of segment 144 for the deblock filtering. For instance, q2 and q0 are both located on line 146 on the right side of segment 144.

The video coder may determine whether the first difference value (e.g., abs(p2−p0)) is less than a threshold (e.g., Beta), and may determine whether the second difference value (e.g., abs(q2−q0)) is less than the threshold (e.g., Beta). Based on the first difference value being less than the threshold value (e.g., ap<Beta), in the above equation, the video coder may add 1 to the initial clipping value, regardless of the bit depth. Based on the second difference value being less than the threshold (e.g., aq<Beta), in the above equation, the video coder may add 1 to the initial clipping value, regardless of the bit depth. Accordingly, if ac and aq are both less than Beta, then the video coder may add 2 to the initial clipping value.

The addition of 1 or 2 based on ac being less than Beta and/or aq being less than Beta may mean that the adjustment value by which to adjust the initial deblocking control parameter (e.g., $t_{C0}$) is equal to 1 or 2 regardless of the bit depth of samples of the current block. However, the bit depth may impact by how much the initial deblocking control parameter is to be adjusted. Accordingly, failure to account for the bit depth in determining the deblocking control parameters, such as the clipping parameter ($t_C$), may result in deblocking control parameters that do not properly control the deblock filtering. For instance, if the bit depth is not accounted for in determining the clipping parameter ($t_C$), then after deblock filtering is performed, the resulting value may be clipped to too small of a range resulting in oversmoothing or undersmoothing.

In accordance with one or more examples described in this disclosure, a video coder (e.g., video encoder 200 or video decoder 300) may apply bit-depth, or user-defined or other types of content-dependent adjustment to all components of the deblocking control parameters (e.g., β and $t_C$). One example for resolving problem of H.264/AVC deblocking adjustment is shown below:

If chromaEdgeFlag is equal to 0, $$t_{C0}=t'_{C0}*(1<<\text{BitDepthAdjustment})$$

Otherwise (chromaEdgeFlag is equal to 1), $$t_{C0}=t'_{C0}*(1<<\text{BitDepthAdjustment}))$$

The threshold variables ap and aq are derived by:

$$ap=\text{Abs}(p2-p0)$$

$$aq=\text{Abs}(q2-q0).$$

The threshold variable $t_C$ is determined as follows:
If chromaStyleFilteringFlag is equal to 0, $$t_C=t_{C0}+((ap<\text{Beta})?(1<<\text{BitDepthAdjustment}):0)+((aq<\text{Beta})?(1<<\text{BitDepthAdjustment}):0)$$

Otherwise (chromaStyleFilteringFlag is equal to 1), $$t_C=t_{C0}+(1<<\text{BitDepthAdjustment})$$

In the above example, $t_{C0}$ may be an initial deblocking control parameter (e.g., initial clipping value) and $t_C$ is the deblocking control parameter that video encoder 200 and video decoder 300 determine (e.g., $t_C$ is the clipping value used for deblock filtering). As shown in the example equation, $t_C$ is determined based on BitDepthAdjustment (e.g., (1<<BitDepthAdjustment), where BitDepthAdjustment is an example of adjustment to bit depth parameter.

For instance, in one or more examples described in this disclosure, the video coder may determine one or more initial deblocking control parameters based on a stored parameter and a bit depth of samples of a current block of the video data. As an example, the video coder may determine the stored parameter (e.g., $t'_{C0}$) based on indices into a look-up table. The indices into the look-up table may be based on the quantization parameters of blocks around a segment (e.g., of block P 130 and block Q 132) and the boundary strength (BS) value. As one example, the video coder may store a look-up table such as Table 35 described in section 8.8.3.6 of the EVC Draft, where the entries in the look-up table are defined by indexA and the bS (boundary strength) value. The value for indexA is based on the quantization parameters.

The video coder may determine the initial deblocking control parameter (e.g., initial clipping parameter ($t_{C0}$) based on the stored parameter ($t'_{C0}$) and the bit depth of samples of a current block of the video data (e.g., BitDepthAdjustment). For instance, as described above, $t_{C0}=t'_{C0}*(1<<\text{Bit-DepthAdjustment})$.

The video coder may determine an adjustment value by which to adjust the one or more initial deblocking control parameters based on the bit depth of the samples of the current block. For instance, as set forth above, the video coder may determine ((ap<Beta) ? (1<<BitDepthAdjustment):0)+((aq<Beta) ? (1<<BitDepthAdjustment):0). That is, the video coder may determine one or more deblocking control parameters ($t_C$) as $t_{C0}+((ap<\text{Beta})$ ? (1<<BitDepthAdjustment):0)+((aq<Beta) ? (1<<BitDepthAdjustment):0).

For example, the video coder may determine ap, where ap is a first difference value between two samples in a line (e.g., line 146) that are located in a first direction of a segment (e.g., segment 144) for the deblock filtering. As described above, video coder may determine abs(p2−p0), which is equal to ap. The video coder may determine aq, where aq is a second difference value between two samples in a line (e.g., line 146) that are located in a second direction of a segment (e.g., segment 144) for the deblock filtering. As described above, video coder may determine abs(q2−q0), which is equal to aq.

The video coder may determine whether the first difference value (ap) and the second difference value (aq) are less than a threshold value (e.g., Beta). As described above, the video coder may determine the threshold value (Beta) based on quantization parameters of a first block (e.g., block P 130) in the first direction of the segment (e.g., segment 128) and a second block (e.g., block Q 132) in the second direction of the segment (e.g., segment 128).

Based on the first difference value (ap) being less than a threshold value (Beta), the video coder may add the adjustment value to the one or more initial deblock control parameters. Based on the second difference value (aq) being less than the threshold value (Beta), the video coder may add the adjustment value to the one or more initial deblock control parameters. For example, the adjustment value may be equal to (1<<BitDepthAdjustment). In this example, the video coder may determine the adjustment value based on the bit depth of the samples of the current block. For example, the adjustment value is based on BitDepthAdjustment, which may be based on or equal to the bit depth of the samples of the current block. As one example, the bit depth is 10 bits or greater than 10 bits, meaning for each color component or luminance and chroma component, there are 10 bits or greater than 10 bits available.

The above example is described with respect to bit depth and $t_C$. However, the example techniques may be utilized for other adjustments (e.g., bit depth adjustments, user-defined adjustments, content-dependent adjustments, or any combination). Also, the example techniques may be extended to other deblocking control parameters (e.g., β).

In the above equations, $t_{C0}=t'_{C0}*(1<<\text{BitDepthAdjustment})$, and $t_C=t_{C0}+ap<\text{Beta})$ ? (1<<BitDepthAdjustment):0)+((aq<Beta) ? (1<<BitDepthAdjustment):0). These two above equations may be rewritten as follows. For instance, tcIncP=((ap<β) ? 1:0) and tcIncQ=((aq<) ? 1:0), and substituting the equation of $t_{C0}$ is $t_C$ result in:

$$t_C=t'_{C0}*(1<<\text{BitDepthAdjustment})+tcIncP*(1<<\text{BitDepthAdjustment})+tcIncQ*(1<<\text{BitDepthAdjustment}).$$

By factoring out (1<<BitDepthAdjustment) from the above, the equation for $t_C$ can be written as:

$$t_C=(t'_{C0}+tcIncP+tcIncQ)*(1<<\text{BitDepthAdjustment}).$$

In the equation, $t_C=(t'_{C0}+tcIncP+tcIncQ)*(1<<\text{BitDepthAdjustment})$, the operation of $(t'_{C0})*(1<<\text{BitDepthAdjustment})$ may be considered as an example of determining one or more initial deblocking control parameters based on a stored parameter and a bit depth of samples of a current block of the video data. The operation (tcIncP+tcIncQ)*(1<<BitDepthAdjustment) may be considered as an example of an adjustment value by which the one or more initial deblocking control parameters are adjusted. The adjustment value (e.g., (tcIncP+tcIncQ)*(1<<BitDepthAdjustment)) is based on the bit depth of the samples of the current block (e.g., BitDepthAdjustment).

In the example where the adjustment value is (tcIncP+tcIncQ)*(1<<BitDepthAdjustment)), the adjustment value may be considered as being based on variance of neighboring pixels. For instance, tcIncP is based on ap, and ap is equal to abs(p2−p0), which is indicative of variance of pixels p2 and p0, tcIncQ is based on aq, and aq is equal to abs(q2−q0), which is indicative of variance of pixels q2 and q0.

Mathematically, there may be various ways in which to represent $t_{C0}=t'_{C0}*(1<<\text{BitDepthAdjustment})$, and $t_C=t_{C0}+((ap<\text{Beta}) ? (1<<\text{BitDepthAdjustment}): 0)+((aq<\text{Beta}) ? (1<<\text{BitDepthAdjustment}):0)$. As described above, one example way to mathematically represent these equations is $t_C=(t'_{C0}+\text{tcIncP}+\text{tcIncQ})*(1<<\text{BitDepthAdjustment})$, where tcIncP=((ap<β) ? 1:0) and tcIncQ=((aq<) ? 1:0). However, there may be other ways in which to represent the equations in a similar mathematical representation.

For instance, another example technique for determining the clipping parameter (e.g., $t_C$) may be as follows:

$$\text{tcIncP}=((ap<\beta)?1:0) \quad (1)$$

$$\text{tcIncQ}=((aq<\beta)?1:0) \quad (2)$$

$$t_C=(t'_{C0}+\text{tcIncP}+\text{tcIncQ})*(1<<(\text{Max}(0,\text{bitDepth}-9)))$$

The above equation for $t_C$ may be similar to the other equations described further above for $t_c$. For example, (Max(0, bitDepth−9) may be an example of BitDepthAdjustment. The above equation for $t_C$ may be applied to pixels at the block edge for deblock filtering.

In accordance with techniques described in this disclosure, regardless of how the mathematical equations are represented, the video coder may be considered as determining one or more initial deblocking control parameters based on a stored parameter and a bit depth of samples of a current block of the video data (e.g., determining $t_{C0}$ or $t'_{C0}*(1<<\text{BitDepthAdjustment})$ and determining an adjustment value by which to adjust the one or more initial deblocking control parameters based on the bit depth of the samples of the current block (e.g., determining (1<<BitDepthAdjustment) or ((tcIncP+tcIncQ)*(1<<BitDepthAdjustment)). The video coder may be considered as determining one or more deblocking control parameters based on the adjustment value and the one or more initial deblock control parameters and deblock filtering one or more samples of the current block based on the determined one or more deblocking control parameters.

Figure 5:
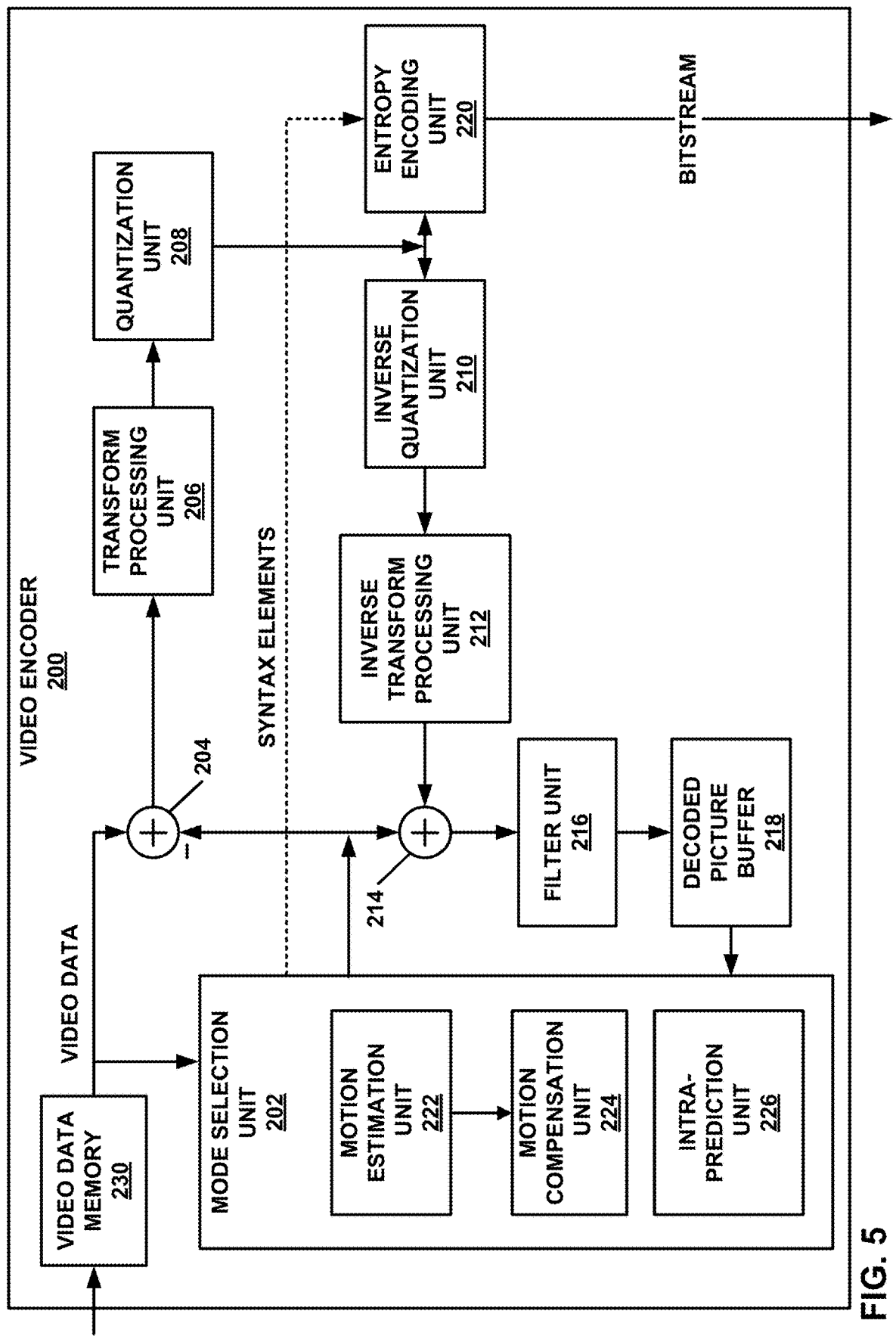
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges (e.g., segments or boundaries) of CUs. Operations of filter unit 216 may be skipped, in some examples.

In one or more examples, filter unit 216 may be configured to perform example techniques described in this disclosure or filter unit 216 in combination with other components of video encoder 200 (e.g., mode selection unit 202) may be configured to perform example techniques described in this disclosure. For instance, filter unit 216 may form part of a decoding loop of video encoder 200. As described above, inverse quantization unit 210 and inverse transform processing unit 212 may be configured to perform the inverse operations of quantization unit 208 and transform processing unit 206, respectively. Reconstruction unit 214 then reconstructs the current block and filter unit 216 may be configured to perform deblock filtering on the reconstructed block prior to storage in decoded picture buffer (DPB) 218.

In accordance with one or more examples described in this disclosure, filter unit 216 may be configured to determine one or more deblocking control parameters based on bit depth of samples in the current block of video data. For example, filter unit 216 may be configured to determine one or more initial deblocking control parameters based on a stored parameter and a bit depth of samples of a current block of the video data. As one example, filter unit 216 may determine the stored parameter based on one or more quantization parameters and a boundary strength value. For instance, filter unit 216 may determine indices into a look-up table stored in video data memory 230 or some other memory based on the quantization parameters and the boundary strength value to determine the stored parameter.

Based on the stored parameter and the bit depth of samples of the current block of the video data, filter unit 216 may determine one or more initial deblocking control parameters. As one example, to determine the one or more initial deblocking control parameters, filter unit 216 may determine an initial clipping parameter (e.g., $t_{C0}$) based on the stored parameter (e.g., $t'_{C0}$) and the bit depth of samples of the current block (e.g., $t_{C0}=t'_{C0}*(1<<\text{BitDepthAdjustment})$).

Filter unit 216 may determine an adjustment value by which to adjust the one or more initial deblocking control parameters based on the bit depth of the samples of the current block. As one example, the adjustment value may be equal to $(1<<\text{BitDepthAdjustment})$. As one example, the bit depth is 10 bits or greater than 10 bits.

Filter unit 216 may determine one or more deblocking control parameters based on the adjustment value and the one or more initial deblock control parameters. For example, filter unit 216 may determine a first difference value between two samples in a line that are located in a first direction of a segment for the deblock filtering (e.g., determine ap, which is equal to abs(p2−p0)). Filter unit 216 may determine a second difference value between two samples in the line that are located in a second direction of the segment for the deblock filtering (e.g., determine aq, which is equal to abs(q2−q0)). To determine one or more deblocking control parameters based on the adjustment value and the one or more initial deblock control parameters, filter unit 216 may be configured to, based on the first difference value (e.g., ap) being less than a threshold value (e.g., Beta), add the adjustment value (e.g., $(1<<\text{BitDepthAdjustment})$) to the one or more initial deblock control parameters (e.g., $t_{C0}$), and based on the second difference value (e.g., aq) being less than the threshold value (e.g., Beta), add the adjustment value (e.g., $(1<<\text{BitDepthAdjustment})$) to the one or more initial deblock control parameters (e.g., $t_{C0}$). As described above, filter unit 216 may determine the threshold value (e.g., Beta) based on quantization parameters of a first block (e.g., block P 130) in the first direction of the segment (e.g., segment 128) and a second block (e.g., block Q 132) in the second direction of the segment (e.g., segment 128).

Accordingly, if just one of ap or aq is less than Beta, then to determine one or more deblocking control parameters based on the adjustment value and the one or more initial deblock control parameters, filter unit 216 may add $(1<<\text{BitDepthAdjustment})$, which is one example of the adjustment value, to the initial clipping parameter (e.g., $t_{C0}$). If both ap and ap are less than Beta, then to determine one or more deblocking control parameters based on the adjustment value and the one or more initial deblock control parameters, filter unit 216 may add $(1<<\text{BitDepthAdjustment})$ twice to the initial clipping parameter (e.g., $t_{C0}$).

Filter unit 216 may deblock filter one or more samples of the current block based on the determined one or more deblocking control parameters. For example, to determine the one or more deblocking control parameters, filter unit 216 may determine a clipping parameter that controls a maximum change of a sample from the deblock filtering. Accordingly, filter unit 216 may deblock filter, and determine whether the result of the deblock filtering of a sample causes a change in the value of the sample to be more than the maximum change allowed by the clipping parameter. Filter unit 216 may then clip the value of the sample so that the change in the magnitude of the sample after deblock filtering is less than or equal to the clipping parameter.

In one or more example, filter unit 216 may perform the deblock filtering as part of a decoding loop to generate the current block used for inter-predicting subsequent blocks. For example, video encoder 200, via filter unit 216, stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform example techniques described in this disclosure. As one example, video encoder 200 (e.g., via filter unit 216) may determine information indicative of one or more adjustments to one or more parameters used for reconstructing the video data (e.g., current block). As one example, the one or more adjustments to one or more parameters comprise bit depth adjustments (e.g., BitDepthAdjustment), user-defined adjustments, or content-dependent adjustments.

Video encoder 200 (e.g., via filter unit 216) may determine one or more deblocking control parameters based on the determined information. The one or more deblocking control parameters include at least one of a clipping value (e.g., $t_C$) used in controlling a maximum change of sample magnitude and a threshold parameter (e.g., β) used in determining a way in which deblock filtering should be performed. As one example, video encoder 200 may determine one or more initial deblocking control parameters (e.g., $t_{C0}$) and determine the one or more deblocking control parameters based on the determined one or more initial deblocking control parameters (e.g., $t_{C0}$) and the determined information (e.g., the adjustments to the one or more parameters used for reconstructing the video data). For instance, to determine $t_C$, video encoder 200 may perform the operations of the following equation: $t_C = t_{C0} + ((a_p < \text{Beta}) ? (1 << \text{BitDepthAdjustment}):0) + ((a_q < \text{Beta}) ? (1 << \text{BitDepthAdjustment}):0)$. In this example, $t_C$ is a clipping value and one of the one or more deblocking control parameters, $t_{C0}$ is one of the one or more initial deblocking control parameters (e.g., initial clipping value), and BitDepthAdjustment is an adjustment to a bit depth parameter that is used for reconstructing the video data. Also, examples of $a_p$, $a_q$ and Beta are described above.

Video encoder 200 (e.g., via filter unit 216) may deblock filter one or more samples of a current block based on the determined one or more deblocking control parameters. Example techniques to perform deblock filtering based on deblocking control parameters (e.g., $t_C$ and β) are described above.

Figure 6:
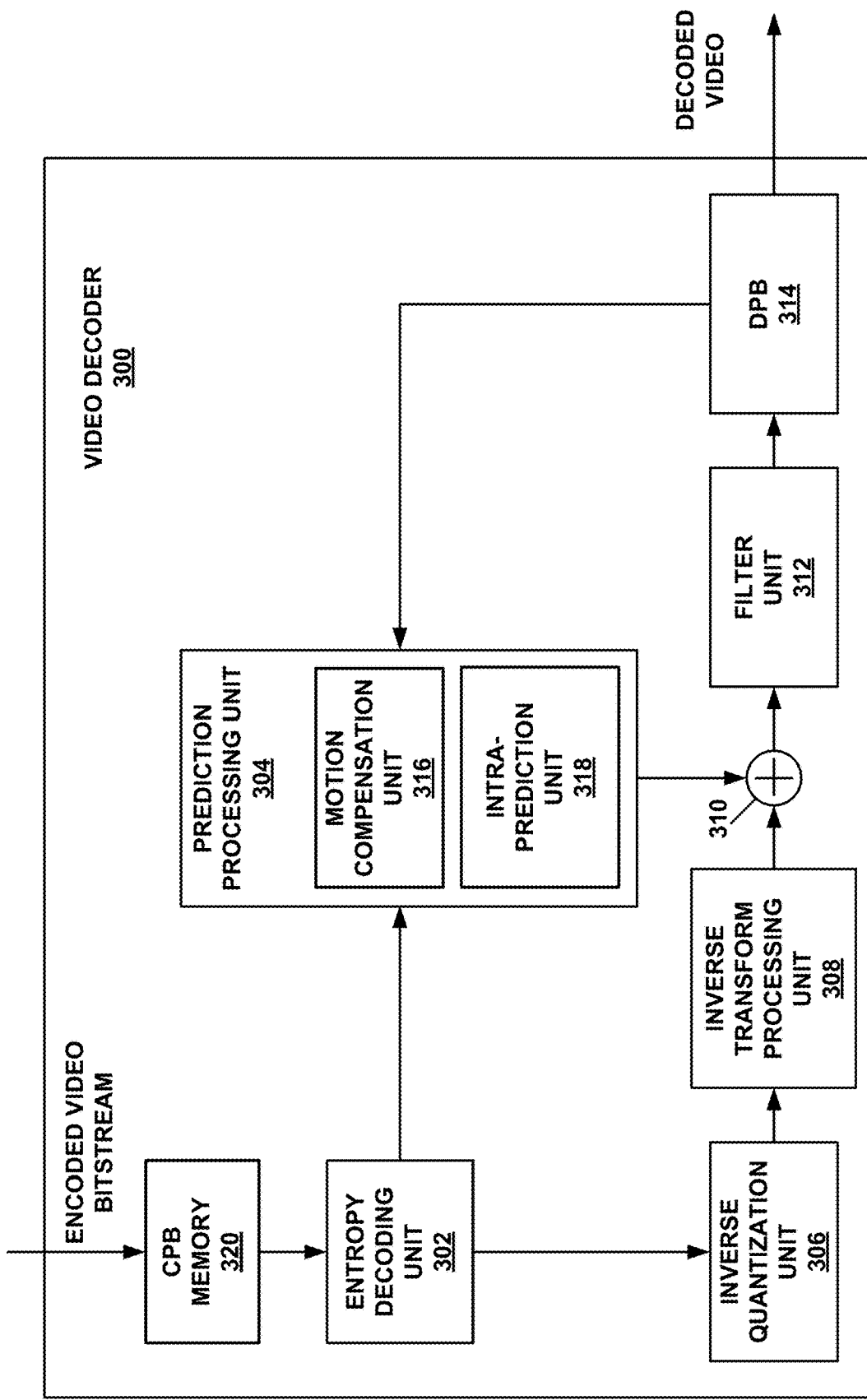
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges (e.g., segments or boundaries) of the reconstructed blocks. Operations of filter unit 312 are not necessarily performed in all examples.

In one or more examples, filter unit 312 may be configured to perform example techniques described in this disclosure or filter unit 312 in combination with other components of video decoder 300 (e.g., prediction processing unit 304) may be configured to perform example techniques described in this disclosure. For instance, filter unit 312 may receive the reconstructed blocks from reconstruction unit 310. Filter unit 312 may be configured to perform deblock filtering on the reconstructed block prior to storage in decoded picture buffer (DPB) 314.

In accordance with one or more examples described in this disclosure, filter unit 312 may be configured to determine one or more deblocking control parameters based on bit depth of samples in the current block of video data. For example, filter unit 312 may be configured to determine one or more initial deblocking control parameters based on a stored parameter and a bit depth of samples of a current block of the video data. As one example, filter unit 312 may determine the stored parameter based on one or more quantization parameters and a boundary strength value. For instance, filter unit 312 may determine indices into a look-up table stored in memory (e.g., CPB memory 320, DPB 314) or some other memory based on the quantization parameters and the boundary strength value to determine the stored parameter.

Based on the stored parameter and the bit depth of samples of the current block of the video data, filter unit 312 may determine one or more initial deblocking control parameters. As one example, to determine the one or more initial deblocking control parameters, filter unit 312 may determine an initial clipping parameter (e.g., $t_{C0}$) based on the stored parameter (e.g., $t'_{C0}$) and the bit depth of samples of the current block (e.g., $t_{C0}=t'_{C0}*(1<<\text{BitDepthAdjustment})$).

Filter unit 312 may determine an adjustment value by which to adjust the one or more initial deblocking control parameters based on the bit depth of the samples of the current block. As one example, the adjustment value may be equal to (1<<BitDepthAdjustment). As one example, the bit depth is 10 bits or greater than 10 bits.

Filter unit 312 may determine one or more deblocking control parameters based on the adjustment value and the one or more initial deblock control parameters. For example, filter unit 312 may determine a first difference value between two samples in a line that are located in a first direction of a segment for the deblock filtering (e.g., determine ap, which is equal to abs(p2−p0)). Filter unit 312 may determine a second difference value between two samples in the line that are located in a second direction of the segment for the deblock filtering (e.g., determine aq, which is equal to abs(q2−q0)). To determine one or more deblocking control parameters based on the adjustment value and the one or more initial deblock control parameters, filter unit 312 may be configured to, based on the first difference value (e.g., ap) being less than a threshold value (e.g., Beta), add the adjustment value (e.g., (1<<BitDepthAdjustment)) to the one or more initial deblock control parameters (e.g., $t_{C0}$), and based on the second difference value (e.g., aq) being less than the threshold value (e.g., Beta), add the adjustment value (e.g., (1<<BitDepthAdjustment)) to the one or more initial deblock control parameters (e.g., $t_{C0}$). As described above, filter unit 312 may determine the threshold value (e.g., Beta) based on quantization parameters of a first block (e.g., block P 130) in the first direction of the segment (e.g., segment 128) and a second block (e.g., block Q 132) in the second direction of the segment (e.g., segment 128).

Accordingly, if just one of ap or aq is less than Beta, then to determine one or more deblocking control parameters based on the adjustment value and the one or more initial deblock control parameters, filter unit 312 may add (1<<BitDepthAdjustment), which is one example of the adjustment value, to the initial clipping parameter (e.g., $t_{C0}$). If both ap and ap are less than Beta, then to determine one or more deblocking control parameters based on the adjustment value and the one or more initial deblock control parameters, filter unit 312 may add (1<<BitDepthAdjustment) twice to the initial clipping parameter (e.g., $t_{C0}$).

Filter unit 312 may deblock filter one or more samples of the current block based on the determined one or more deblocking control parameters. For example, to determine the one or more deblocking control parameters, filter unit 312 may determine a clipping parameter that controls a maximum change of a sample from the deblock filtering. Accordingly, filter unit 312 may deblock filter, and determine whether the result of the deblock filtering of a sample causes a change in the value of the sample to be more than the maximum change allowed by the clipping parameter. Filter unit 312 may then clip the value of the sample so that the change in the magnitude of the sample after deblock filtering is less than or equal to the clipping parameter.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1 (e.g., output the current block with the deblock filtered samples for display). That is, video decoder 300 may be considered as outputting the current block with the deblock filtered samples for display.

In this manner, video decoder 300 represents an example of a video decoding device including a memory configured to store video data, and one or more processing units implemented in circuitry and configured to perform example techniques described in this disclosure. As one example, video decoder 300 (e.g., via filter unit 312) may determine information indicative of one or more adjustments to one or more parameters used for reconstructing the video data (e.g., current block). As one example, the one or more adjustments to one or more parameters comprise bit depth adjustments (e.g., BitDepthAdjustment), user-defined adjustments, or content-dependent adjustments.

Video decoder 300 (e.g., via filter unit 312) may determine one or more deblocking control parameters based on the determined information. The one or more deblocking control parameters include at least one of a clipping value (e.g., $t_C$) used in controlling a maximum change of sample magnitude and a threshold parameter (e.g., β) used in determining a way in which deblock filtering should be performed. As one example, video decoder 300 may determine one or more initial deblocking control parameters (e.g., $t_{C0}$) and determine the one or more deblocking control parameters based on the determined one or more initial deblocking control parameters (e.g., $t_{C0}$) and the determined information (e.g., the adjustments to the one or more parameters used for reconstructing the video data). For instance, to determine $t_C$, video decoder 300 may perform the operations of the following equation: $t_C=t_{C0}+((a_p<\text{Beta})$ ? $(1<<\text{BitDepthAdjustment}):0)+((a_q<\text{Beta})$ ? $(1<<\text{BitDepthAdjustment}):0)$. In this example, $t_C$ is a clipping value and one of the one or more deblocking control parameters, $t_{C0}$ is one of the one or more initial deblocking control parameters (e.g., initial clipping value), and BitDepthAdjustment is an adjustment to a bit depth parameter that is used for reconstructing the video data. Also, examples of $a_p$, $a_q$ and Beta are described above.

Video decoder 300 (e.g., via filter unit 312) may deblock filter one or more samples of a current block based on the determined one or more deblocking control parameters. Example techniques to perform deblock filtering based on deblocking control parameters (e.g., $t_C$ and β) are described above.

Figure 7:
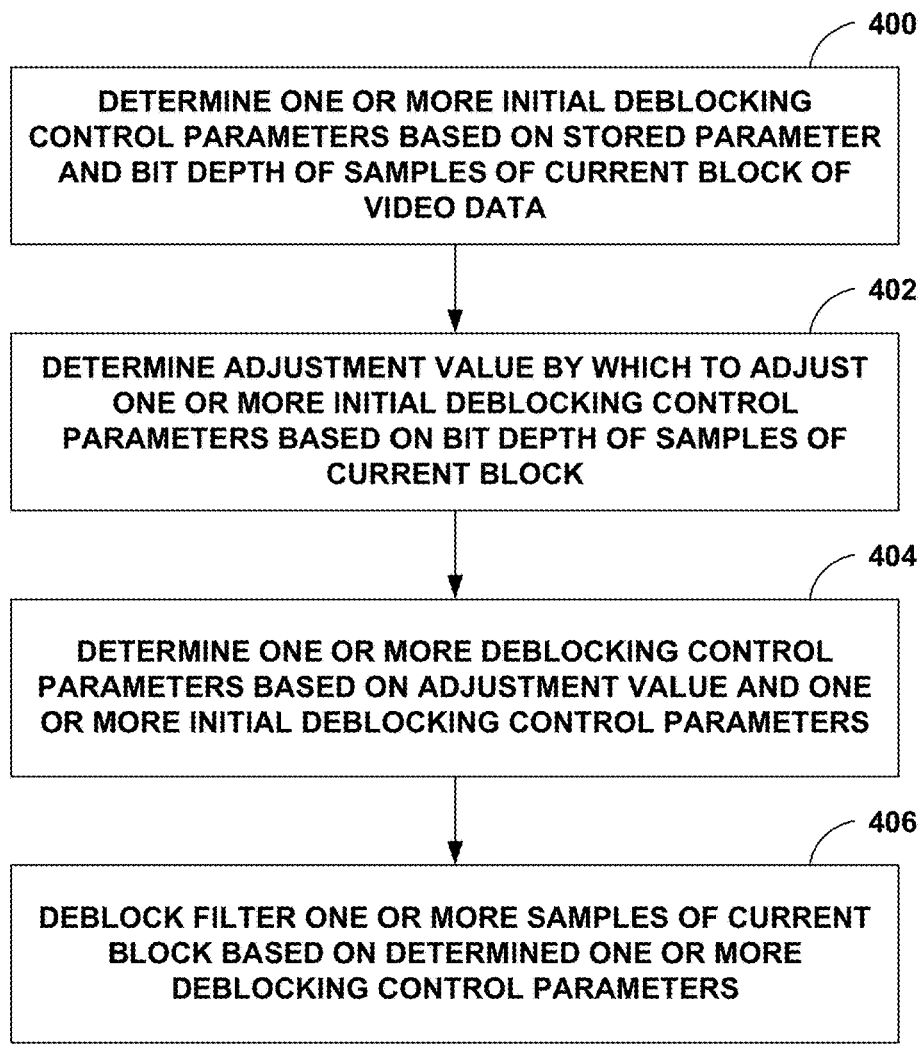
FIG. 7 is a flowchart illustrating an example method for processing video data.

FIG. 7 is a flowchart illustrating an example method for processing video data. The current block may comprise a current CU. Although described with respect to a video coder, examples of which include video encoder 200 and video decoder 300), it should be understood that other devices may be configured to perform a method similar to that of FIG. 7. The example of FIG. 7 is described with respect to processing circuitry. Examples of the processing circuitry includes fixed-function or programmable processing circuitry, such as the processing circuitry of video encoder 200 and/or filter unit 216 or the processing circuitry of video decoder 300 and/or filter unit 312.

A memory such as memory 106, video data memory 230, DPB 218, or some other memory for video encoder 200, or memory 120, CPB memory 320, or DPB 314, or some other memory for video decoder 300 may store parameters that are used for determining deblocking control parameters for deblock filtering.

As illustrated in FIG. 7, the processing circuitry may determine one or more initial deblocking control parameters based on the stored parameter and a bit depth of samples of a current block of the video data (400). For example, the processing circuitry may determine the stored parameter based on one or more quantization parameters and a boundary strength value. The quantization parameters and the boundary strength value may be indices into a look up table stored in the memory, and the processing circuitry may determine the stored parameter by accessing the entry in the lookup table identified by the indices. One example of the lookup table is Table 35 described in section 8.8.3.6 of the EVC Draft.

The one or more initial deblocking control parameters may be an initial clipping parameter (e.g., $t_{C0}$) that the processing circuitry determines based on the stored parameter and the bit depth of samples of the current block. For example, the initial clipping parameter may be: $t_{C0}=t'_{C0}*(1<<\text{BitDepthAdjustment})$, where BitDepthAdjustment is equal to or based on the bit depth of samples of the current block. One example of the bit depth is 10 bits or greater than 10 bits.

The processing circuitry may determine an adjustment value by which to adjust the one or more initial deblocking control parameters based on the bit depth of the samples of the current block (402). One example of the adjustment value is $(1<<\text{BitDepthAdjustment})$. In accordance with one or more examples described in this disclosure, by adjusting the initial deblock control parameters (e.g., $t_{C0}$) based on the adjustment value that is determined based on the bit depth, the example techniques may ensure that the deblocking control parameters are properly scaled based on the bit depth so that the deblocking control parameters provide better deblock filtering as compared to cases where the initial deblocking control parameters are not adjusted based on the bit depth.

The processing circuitry may determine one or more deblocking control parameters based on the adjustment value and the one or more initial deblock control parameters (404). The one or more deblocking control parameters may be a clipping parameter ($t_C$) that controls a maximum change of a sample from the deblock filtering.

As one example, the processing circuitry may determine a first difference value (e.g., ap, as described above) between two samples in a line that are located in a first direction of a segment for the deblock filtering, and determine a second difference value (e.g., aq, as described above) between two samples in the line that are located in a second direction of the segment for the deblock filtering. To determine one or more deblocking control parameters based on the adjustment value and the one or more initial deblock control parameters, the processing circuitry may be configured to, based on the first difference value (e.g., ap) being less than a threshold value (e.g., Beta), add the adjustment value (e.g., $(1<<\text{BitDepthAdjustment})$) to the one or more initial deblock control parameters (e.g., $t_{C0}$), and based on the second difference value (e.g., aq) being less than the threshold value (e.g., Beta), add the adjustment value (e.g., $(1<<\text{BitDepthAdjustment})$) to the one or more initial deblock control parameters (e.g., $t_{C0}$). That is, to determine one or more deblocking control parameters based on the adjustment value and the one or more initial deblock control parameters, the processing circuitry may be configured to determine: $t_C=t_{C0}+((a_p<\text{Beta})$ ? $(1<<\text{BitDepthAdjustment}):0)+((a_q<\text{Beta})$ ? $(1<<\text{BitDepthAdjustment}):0)$.

The processing circuitry may deblock filter one or more samples of the current block based on the determined one or more deblocking control parameters (406). Example ways in which to perform the deblock filtering as described above. For instance, the processing circuitry may implement equations 3-1, 3-2, 3-3, 7-1, 7-2, 8-1, and/or 8-2 described above.

For video encoder 200, the processing circuitry may be configured to deblock filter as part of a decoding loop to generate the current block used for inter-predicting subsequent blocks. For video decoder 300, the processing circuitry may be configured to output for display the current block with the deblock filtered samples.

One or more examples of this disclosure include the following, which may be combined with any one or combination of techniques described in this disclosure.

Example 1. A method of coding video data, the method comprising determining information indicative of one or more adjustments to one or more parameters used for reconstructing the video data, determining one or more deblocking control parameters based on the determined information, and deblock filtering one or more samples of a current block based on the determined one or more deblocking control parameters.

Example 2. The method of example 1, wherein the one or more deblocking control parameters include at least one of a clipping value used in controlling a maximum change of sample magnitude and a threshold parameter used in determining a way in which deblock filtering should be performed.

Example 3. The method of any of examples 1 and 2, further comprising determining one or more initial deblocking control parameters, wherein determining the one or more deblocking control parameters comprises determining the one or more deblocking control parameters based on the determined one or more initial deblocking control parameters and the determined information.

Example 4. The method of any of examples 1-3, wherein the determining the one or more deblocking control parameters based on the determined one or more initial deblocking control parameters and the determined information comprises determining $t_C=t_{C0}+((a_p<\text{Beta})\ ?\ (1<<\text{BitDepthAdjustment}):0)+((a_q<\text{Beta})\ ?\ (1<<\text{BitDepthAdjustment}):0)$, wherein $t_C$ is a clipping value and one of the one or more deblocking control parameters, wherein $t_{C0}$ is one of the one or more initial deblocking control parameters, and wherein BitDepthAdjustment is an adjustment to a bit depth parameter.

Example 5. The method of any of examples 1-4, wherein the one or more adjustments to one or more parameters comprise bit depth adjustments, user-defined adjustments, or content-dependent adjustments.

Example 6. The method of any of examples 1-5, wherein the method of coding comprises a method of encoding, and wherein the features of any of examples 1-5 are performed as part of a decoding loop in the method of encoding.

Example 7. The method of any of examples 1-5, wherein the method of coding comprises a method of decoding.

Example 8. A device for coding video data, the device comprising a memory configured to store the video data and a video coder comprising at least one of fixed-function or programmable circuitry, wherein the video coder is configured to perform the method of any of examples 1-5.

Example 9. The device of example 8, wherein the video coder is a video encoder, and wherein the video encoder is configured to perform the features of any of examples 1-5 as part of a decoding loop.

Example 10. The device of example 8, wherein the video coder is a video decoder.

Example 11. The device of any of example 8-11, further comprising one or more of a display configured to display decoded video data, a camera, a computer, a mobile device, a broadcast receiver device, or a set-top box.

Example 12. A computer-readable storage medium having stored thereon instructions that, when executed, cause one or more processors to perform the method of any of examples 1-7.

Example 13. A device for coding video data, the device comprising means for performing the method of any of examples 1-7.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining one or more initial deblocking control parameters based on a stored parameter and a bit depth of samples of a current block of the video data;

determining an adjustment value by which to adjust the one or more initial deblocking control parameters based on the bit depth of the samples of the current block;

determining a variance of pixels proximate a segment at a boundary of or within the current block;

determining one or more deblocking control parameters based on the adjustment value, in response to the variance of pixels being less than a threshold value, and the one or more initial deblock control parameters; and deblock filtering one or more samples of the current block based on the determined one or more deblocking control parameters.

2. The method of claim 1, wherein determining the one or more deblocking control parameters comprises determining a clipping parameter that controls a maximum change of a sample from the deblock filtering.

3. The method of claim 2, wherein determining the one or more initial deblocking control parameters comprises determining an initial clipping parameter based on the stored parameter and the bit depth of samples of the current block.

4. The method of claim 1, wherein determining a variance of pixels proximate the segment comprises:

determining a first difference value between two samples in a line that are located in a first direction of the segment for the deblock filtering;

determining a second difference value between two samples in the line that are located in a second direction of the segment for the deblock filtering, wherein determining one or more deblocking control parameters based on the adjustment value, in response to the variance of pixels being less than a threshold value, and the one or more initial deblock control parameters comprises:

based on the first difference value being less than the threshold value, adding the adjustment value to the one or more initial deblock control parameters; and based on the second difference value being less than the threshold value, adding the adjustment value to the one or more initial deblock control parameters.

5. The method of claim 4, further comprising:

determining the threshold value based on quantization parameters of a first block in the first direction of the segment and a second block in the second direction of the segment.

6. The method of claim 1, further comprising:

determining the stored parameter based on one or more quantization parameters and a boundary strength value.

7. The method of claim 1, wherein the bit depth is 10 bits or greater than 10 bits.

8. The method of claim 1, further comprising:

outputting the current block with the deblock filtered samples for display.

9. The method of claim 1, wherein deblock filtering comprises deblock filtering as part of a decoding loop to generate the current block used for inter-predicting subsequent blocks.

10. A device for processing video data, the device comprising:

a memory configured to store a parameter used for deblock filtering; and processing circuitry configured to:

determine one or more initial deblocking control parameters based on the stored parameter and a bit depth of samples of a current block of the video data;

determine an adjustment value by which to adjust the one or more initial deblocking control parameters based on the bit depth of the samples of the current block;

determine a variance of pixels proximate a segment at a boundary of or within the current block;

determine one or more deblocking control parameters based on the adjustment value, in response to the variance of pixels being less than a threshold value, and the one or more initial deblock control parameters; and deblock filter one or more samples of the current block based on the determined one or more deblocking control parameters.

11. The device of claim 10, wherein to determine the one or more deblocking control parameters, the processing circuitry is configured to determine a clipping parameter that controls a maximum change of a sample from the deblock filtering.

12. The device of claim 11, wherein to determine the one or more initial deblocking control parameters, the processing circuitry is configured to determine an initial clipping parameter based on the stored parameter and the bit depth of samples of the current block.

13. The device of claim 10, wherein to determine a variance of pixels proximate the segment, the processing circuitry is configured to:

determine a first difference value between two samples in a line that are located in a first direction of the segment for the deblock filtering;

determine a second difference value between two samples in the line that are located in a second direction of the segment for the deblock filtering, wherein to determine one or more deblocking control parameters based on the adjustment value, in response to the variance of pixels being less than a threshold value, and the one or more initial deblock control parameters, the processing circuitry is configured to:

based on the first difference value being less than the threshold value, add the adjustment value to the one or more initial deblock control parameters; and based on the second difference value being less than the threshold value, add the adjustment value to the one or more initial deblock control parameters.

14. The device of claim 13, wherein the processing circuitry is configured to:

determine the threshold value based on quantization parameters of a first block in the first direction of the segment and a second block in the second direction of the segment.

15. The device of claim 10, wherein the processing circuitry is configured to:

determine the stored parameter based on one or more quantization parameters and a boundary strength value.

16. The device of claim 10, wherein the bit depth is 10 bits or greater than 10 bits.

17. The device of claim 10, wherein the processing circuitry is configured to:

output the current block with the deblock filtered samples for display.

18. The device of claim 10, wherein to deblock filter, the processing circuitry is configured to deblock filter as part of a decoding loop to generate the current block used for inter-predicting subsequent blocks.

19. The device of claim 10, further comprising one or more of a display configured to display the current block with the deblock filtered samples, a camera, a computer, a mobile device, a broadcast receiver device, or a set-top box.

20. A non-transitory computer-readable storage medium having stored thereon instructions that, when executed, cause one or more processors to:
- determine one or more initial deblocking control parameters based on a stored parameter and a bit depth of samples of a current block of the video data;
- determine an adjustment value by which to adjust the one or more initial deblocking control parameters based on the bit depth of the samples of the current block;
- determine a variance of pixels proximate a segment at a boundary of or within the current block:
- determine one or more deblocking control parameters based on the adjustment value, in response to the variance of pixels being less than a threshold value, and the one or more initial deblock control parameters; and
- deblock filter one or more samples of the current block based on the determined one or more deblocking control parameters.

* * * * *